(12) United States Patent
Kompalli et al.

(10) Patent No.: US 8,984,404 B2
(45) Date of Patent: Mar. 17, 2015

(54) GUIDING AN IMAGE-BASED TASK EXECUTION

(75) Inventors: Suryaprakash Kompalli, Karnataka (IN); Vimal Sharma, Karnataka (IN); Praphul Chandra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 13/476,358

(22) Filed: May 21, 2012

(65) Prior Publication Data
US 2012/0304060 A1 Nov. 29, 2012

(30) Foreign Application Priority Data
May 27, 2011 (IN) .......................... 1805/CHE/2011

(51) Int. Cl.
*G06F 3/00* (2006.01)
*G06Q 20/10* (2012.01)
*G06F 17/24* (2006.01)
*G06F 17/00* (2006.01)
*G06F 17/30* (2006.01)
*G06F 3/048* (2013.01)
*G06F 17/21* (2006.01)
*G06F 3/0484* (2013.01)
*G06F 3/0481* (2013.01)
*G06F 3/0488* (2013.01)
*G06F 3/0483* (2013.01)
*G06K 9/00* (2006.01)
*G06Q 20/32* (2012.01)

(52) U.S. Cl.
CPC ............ *G06Q 20/102* (2013.01); *G06F 17/243* (2013.01); *G06F 17/00* (2013.01); *G06F 17/30* (2013.01); *G06F 3/048* (2013.01); *G06F 17/21* (2013.01); *G06F 3/0484* (2013.01); *G06F 3/0481* (2013.01); *G06F 3/04883* (2013.01); *G06F 3/0483* (2013.01); *G06K 9/00449* (2013.01); *G06K 9/00* (2013.01); *G06K 9/00469* (2013.01); *G06Q 20/3274* (2013.01)
USPC ............ 715/709; 715/233; 715/221; 715/222; 715/223; 715/224; 715/225; 715/226; 382/317

(58) Field of Classification Search
CPC ....... G06F 17/243; G06F 17/00; G06F 17/30; G06F 17/21; G06F 3/048; G06F 3/0481; G06F 3/0483; G06F 3/0484; G06F 3/04883; G06K 9/00449; G06K 2209/01; G06K 9/00; G06K 9/00469
USPC ................... 715/709, 233, 221–226; 382/317
See application file for complete search history.

(56) References Cited

U.S. PATENT DOCUMENTS 6,351,559 B1  2/2002  Zhou et al.
7,024,486 B2  4/2006  Itoh
(Continued)

OTHER PUBLICATIONS

Himanshu Chauhan et al., "WAV: Voice Access to Web Information for Masses", W3C Workshop 2010, May 6-7, 2010, New Dehli, India.

*Primary Examiner* — William Bashore
*Assistant Examiner* — James F Sugent
(74) *Attorney, Agent, or Firm* — Hewlett-Packard Patent Department

(57) ABSTRACT

Provided is a method of guiding an image-based task execution. The method allows a user of a computing device to record an association between an image and at least one task, wherein a task is an action related to content present in the image; and upon subsequent recognition of the image, guides a user to perform the at least one task associated with the image, based on previously recorded association.

18 Claims, 6 Drawing Sheets

(56) References Cited

U.S. PATENT DOCUMENTS

| | | |
|---|---|---|
| 2003/0233619 A1* | 12/2003 | Fast ............................ 715/517 |
| 2004/0130749 A1 | 7/2004 | Aoki |
| 2006/0059247 A1 | 3/2006 | Marappan et al. |
| 2007/0253643 A1 | 11/2007 | Nagarajan et al. |
| 2008/0195954 A1 | 8/2008 | Dharmarajan et al. |
| 2009/0119574 A1* | 5/2009 | Gitlin et al. ................... 715/209 |
| 2010/0177964 A1 | 7/2010 | King et al. |
| 2010/0302604 A1* | 12/2010 | Kodimer et al. .............. 358/474 |
| 2010/0331043 A1 | 12/2010 | Chapman et al. |
| 2011/0164813 A1* | 7/2011 | Enomoto ...................... 382/164 |
| 2012/0078781 A1* | 3/2012 | Ross et al. ...................... 705/40 |
| 2012/0183211 A1* | 7/2012 | Hsu et al. ...................... 382/164 |
| 2013/0170741 A9* | 7/2013 | Hsu et al. ...................... 382/164 |

\* cited by examiner

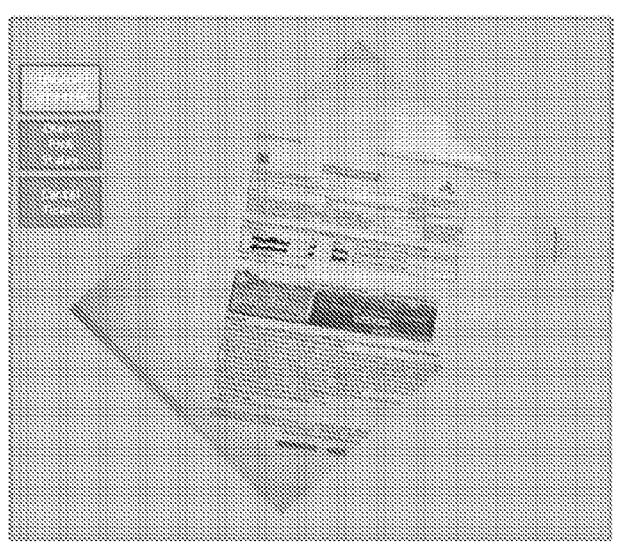
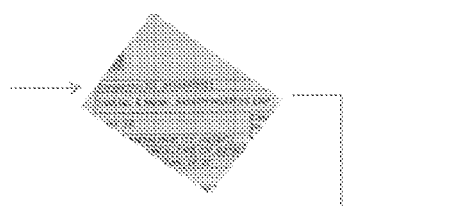
FIG. 9
FIG. 10

GUIDING AN IMAGE-BASED TASK EXECUTION

CLAIM FOR PRIORITY

The present application claims priority under 35 U.S.C 119(a)-(d) to Indian application number 1805/CHE/2011, filed on May 27, 2011, which is incorporated by reference in its entirety.

BACKGROUND

Internet has transformed a number of things not only from an individual's perspective but also from a business entity's standpoint. If the internet has enabled individuals to get closer to each other through social networking and other web based tools, businesses have also not left behind to use the tremendous reach of the medium to their benefit. They have embraced it to present another facet of their existence. However, whereas some of the businesses have limited themselves to simply maintaining a web presence (website) for their customers, the others have gone down further to utilize the opportunities that it offered.

It is not uncommon to find a company using a web-based interface to provide customer support, receive consumer complaints or offer a web-based bill payment system to its customers. A user simply requires a computing device and a network connection to complete a variety of tasks. Nonetheless, therein lies the catch. All such transactions require a certain amount of skill and knowledge on the part of a user. A person who is only familiar with a paper based interface (such as, a utility bill) may find it difficult to perform a web-based transaction.

BRIEF DESCRIPTION OF THE DRAWINGS

For a better understanding of the solution, embodiments will now be described, purely by way of example, with reference to the accompanying drawings, in which:

FIG. 9 is a diagram of a graphical user interface (GUI), in which a user selects at least one task associated with an image, according to an embodiment.

FIG. 10 is a diagram of a graphical user interface (GUI), in which the method displays execution of a selected task, according to an embodiment.

DETAILED DESCRIPTION OF THE INVENTION

As mentioned earlier, the internet has enabled businesses to offer various web-based solutions to its customers. These solutions may range from a simple form filing for obtaining customer feedback to complex payment transactions involving providing log-in details, credit card information, payment gateway passwords, and so and so forth. In any case, such transactions require a certain amount of familiarity and comfort level with devices and technology on a user's part. It is not difficult to realize that some users may not have an inclination or preference for solely web-based interactions. They would rather prefer to continue with a traditional paper based approach.

The present disclosure proposes a merger between a paper (document) based approach to a transaction and a web-based interface. It guides a user to execute a web-based transaction using a document as an initial template.

Embodiments of the present solution provide a method and system for guiding a user to perform an image-based task execution.

For the sake of clarity, the term "user" may include a "consumer", an "individual", a "person", or the like.

Figure 1:
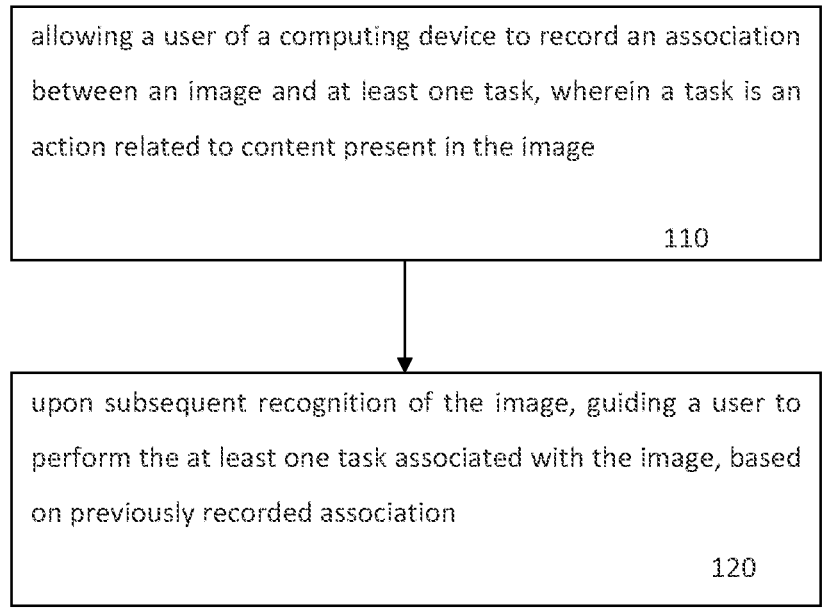
FIG. 1 shows a flow chart of a method for guiding an image-based task execution, according to an embodiment.

FIG. 1 shows a flow chart of a method for guiding an image-based task execution, according to an embodiment.

The method may be implemented on a computing device (system), such as, but not limited to, a personal computer, a desktop computer, a laptop computer, a notebook computer, a network computer, a personal digital assistant (PDA), a mobile device, a hand-held device, a television (TV), or the like. A typical computing device that may be used is described further in detail subsequently with reference to FIG. 11.

Additionally, the computing device may be connected to another computing device or a plurality of computing devices via a network, such as, but not limited to, a Local Area Network (LAN), a Wide Area Network, the Internet, or the like.

Referring to FIG. 1, block 110 involves allowing a user of a computing device to record an association between an image and at least one task, wherein a task is an action related to content present in the image.

For the sake of clarity, a task may include a transaction or process that a user of a computing device may accomplish using his or her computing device or a computing device communicatively coupled to the user's device. In an instance, a task may have a web based transaction component that requires a user to connect to the internet. In another instance, a task may include both an offline and an online element. A task may include a single transaction or multiple transactions. Further, a task may include a series of transactions bundled together in the form of a module called a tasklet. A tasklet could be run on a user's device or on the web (for example, in a cloud environment).

To provide a few non-limiting illustrations of tasks, by way of example, a task may include payment of a utility bill, purchasing an airline ticket, booking a cab, checking into a hotel, a personal accounting transaction, and the like.

In an example, a user may associate a pre-existing image with at least one task. To illustrate, a user may associate a pre-existing image of a utility bill with a task for an online payment of the utility bill. The image would be considered as an electronic image of the paper document. In another example, a user may obtain a new image for association with a task. For instance, if a user wishes to associate a new document image (for example, an airline ticket) with a task (for example, a task to check a flight status), he or she may simply take a photograph of the document. The image may be obtained through an imaging device (such as, a camera), which may be removably or non-removably attachable to a user's device, or an unconnected unit altogether.

Further, more than one task may be associated with an image. To illustrate, an image of an airline ticket can be associated with multiple tasks, such as, checking of flight status, verification of passenger seat number, submission of check-in details to the airline, etc.

As it may have been inferred from above, a task associated with an image is typically an action (or transaction) that relates to content present in the image. To illustrate in the context of the airline ticket scenario above, associated tasks, such as, checking the flight status, verifying the seat number, providing check-in details to the airline, etc. rely on information or content present in the image of the airline ticket. For instance, checking of flight status may require flight details from the image and verification of seat number or submission of check-in details may require passenger name or other details from the image. In all cases, for execution, the associated task requires some detail from the document image.

The method enables a user to record an association between an image and a task. In an example, an authoring application is used to record an association between an image and a task. The authoring application may be present on a user's computing device or it may be hosted on another computing device (for example, a server computer). In case, it is hosted on another device (for example, in a cloud environment), a user may access the authoring application by connecting to the host device through suitable networking means, which may be wired or wireless. In an instance, the authoring application may have a Graphical User Interface (GUI) for a user to record an association between an image and at least one task.

In an example, a user may record an association between an image and a task by first identifying or selecting an input image for association. An input image may be selected from within an authoring application as well. Once an input image has been identified, a user "defines" an association between an image and a task by a number of steps. In one instance, a user identifies and selects at least one area of interest on the image. An area of interest includes a region on the image which may include details that are of interest to a user. To provide an illustration, let's assume that a user has selected an image of a railway ticket as an input image. The image of the railway ticket may carry a number of details, such as, Train No. and Name, PNR No., Name of the passenger(s), Date of travel, Date of booking, Origin and destination stations, and so and so forth. All these details are present at various locations on the input image. Let's assume that a user is only interested in Train Name and PNR No. details. In such instance, a user may select those areas on the input image which provides (or captures) the information which is of interest to a user (Train Name and PNR No.). An authoring application may be used to identify and select areas of interest on an image.

Upon identification of an area(s) of interest (on the image) by a user, the region(s) capturing these details is/are segregated from rest of the input image. For instance, if a user selects Train Name and PNR No. from an input document image of a railway ticket, then the regions that capture these details are identified from the rest of the document image.

Once an area(s) of interest on an image is/are identified, a user may begin associating the input image with a task of his or her choice. In an instance, however, before a user could associate a task with an image, he or she may need to identify and understand various parameters (or steps) that may be required to accomplish the task. For instance, in the context of the railway ticket image example mentioned above, if a user wants to associate an online Train Schedule request task with the ticket's image, the user would be required to know the online parameter associated with obtaining the Train Schedule request from the Internet. In this case, the parameter may be the Train Name/Number to obtain the Train Schedule details.

An association between an input image and a task is made with a user mapping (associating) an area of interest on an input image with a corresponding parameter of an identified task. In the above example, the Train Name (an area of interest on the image) is mapped to the Train Schedule (an input parameter on the web site of the rail company) request task. An area of interest on an image acts as an input for an associated task.

The association between an input image and a task (i.e. mapping between an area of interest on an input image and a corresponding parameter of the task) is recorded by a user. In an instance, it is done through an authoring application. By way of a non-limiting illustration, a user may begin recording the association by selecting a menu item or clicking a "Start Task Recording" button on the GUI of the authoring application. Once the mapping is complete, the recording is stopped, for example, by clicking an "End Task Recording" button of the authoring application.

All associations between an input image and a task (i.e. mapping between an area of interest on an input image and a corresponding parameter of the task) may be similarly recorded. Similar mechanism may be used to associate multiple tasks with an image.

Once the recording of an association between a task and an image is complete, the recording may be stored on a user's computing device or a remote computing device (for example, in a cloud environment), which may be connectable to the user's computing device. All tasks associated with an image may be stored.

Block 120 illustrates the runtime aspect of the proposed method. It involves that upon subsequent recognition of an image, a user is guided to perform at least one task associated with the image, based on a previously recorded association.

Wherein block 110 highlighted the authoring aspect of associating at least one task with an image, block 120 entails the run time environment when a user may have already associated at least one task with an image and the association has been recorded and stored.

Upon subsequent recognition of an input image of block 110, a computing device may present to a user all tasks which were previously associated with the input image. The associated tasks may be displayed on a user's computing device for making a selection. To illustrate, if a user had associated multiple tasks, such as, checking of flight status, verification of passenger seat number, submission of check-in details to the airline, etc., with the document image of an airline ticket, the user may be presented with all associated tasks upon subsequent recognition of the airline ticket image.

Once a user selects an associated task for execution, the method guides a user to perform the selected task based on previously recorded association between the image and the associated task. To illustrate, if a user selects an online Train Schedule request task associated with an image of a railway ticket, the user would be guided, in an instance step-by-step, on how to perform the task.

The guidance to a user may be provided in many ways. Some examples, by way of non-limitation, may include, an instance where a user may be prompted to perform a step related to a task execution by highlighting an area requiring a user input on the user's display device. In another instance, voice prompts may be provided draw a user's attention to a step requiring user input.

Further the guidance may relate to prompting a user to select at least one area of interest on the image. It may also relate to prompting a user to map at least one identified area of interest on an image with a corresponding parameter of the at least one task.

In another example, the guidance may involve a request to a user to obtain at least one additional copy of the image in an event an original image is inadequate to perform a task. For instance, if the image is not identifiable by the device or if some details of the image are unclear, a user may be prompted to obtain further copies of the image, which a user may provide by clicking an image with the device's camera (if available) or through another imaging device. If a task requires multiple images of a document for proper execution, a user may be prompted to obtain the same, and the images may be stitched together by an application to create a single (and scrollable) image.

In any event, the method provides guidance to a user (especially, a layman) to execute an image-based task which may have a paper based component along with a web based transaction aspect.

Figure 2:
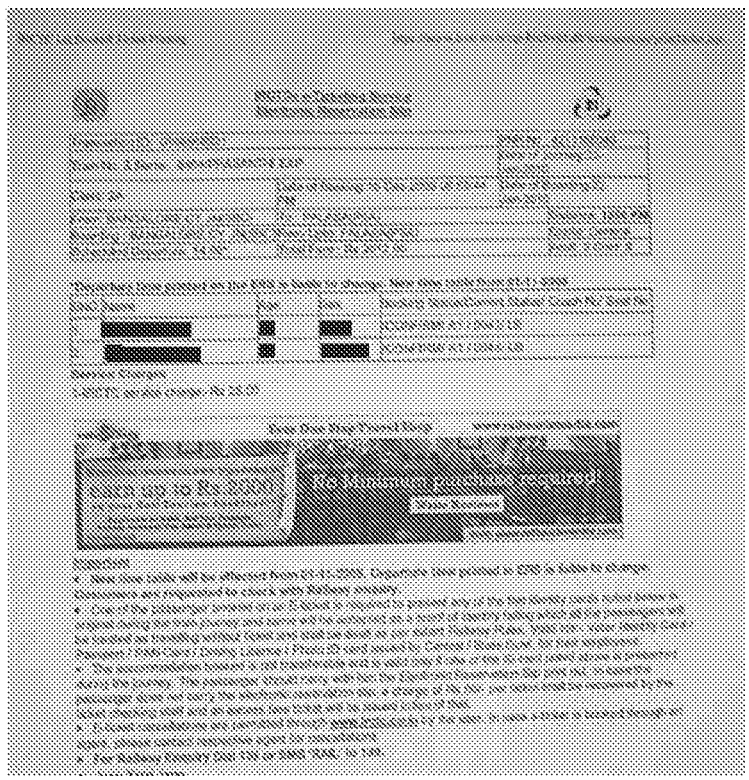
FIG. 2 shows an example of an image, according to an embodiment.

FIG. 2 shows an example of an image, according to an embodiment. In an instance, the representative image may be an original input image of a document for associating a task. In another instance, the image may be a subsequent image of the document for finding tasks that might be associated with the image.

In the present instance, the representative image is an image of a paper railway ticket providing a number of details, such as, Train No. and Name, PNR No., Name of the passenger(s), Date of travel, Date of booking, Origin and destination stations, and so and so forth.

Figure 3:
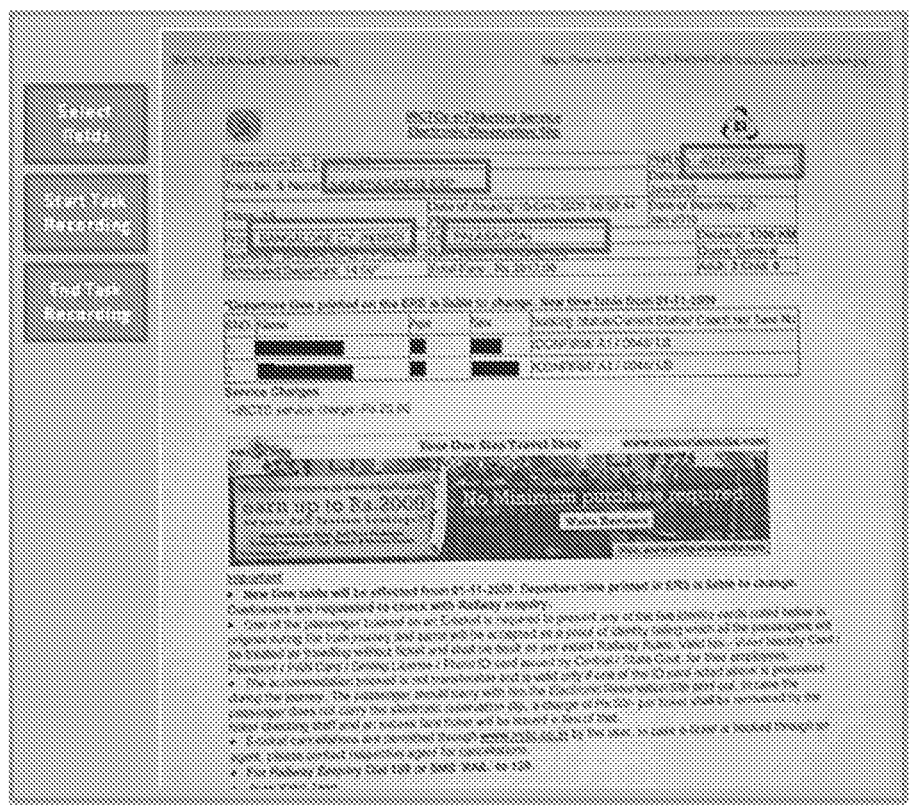
FIG. 3 is a diagram of a graphical user interface (GUI), according to an embodiment.

FIG. 3 is a diagram of a graphical user interface (GUI), according to an embodiment. FIG. 3 illustrates a representative GUI of an authoring application for associating an input image with a task. The authoring application provides for the selection of a number of user commands for enabling recording of an association between an image and a task. The commands include, "Select fields", "Start task recording" and "End task recording". These commands and their representation by way of buttons in the authoring application is merely for the purposes of an illustration, by way of an example, and many other representations may be created by a person skilled in the art.

Figure 4:
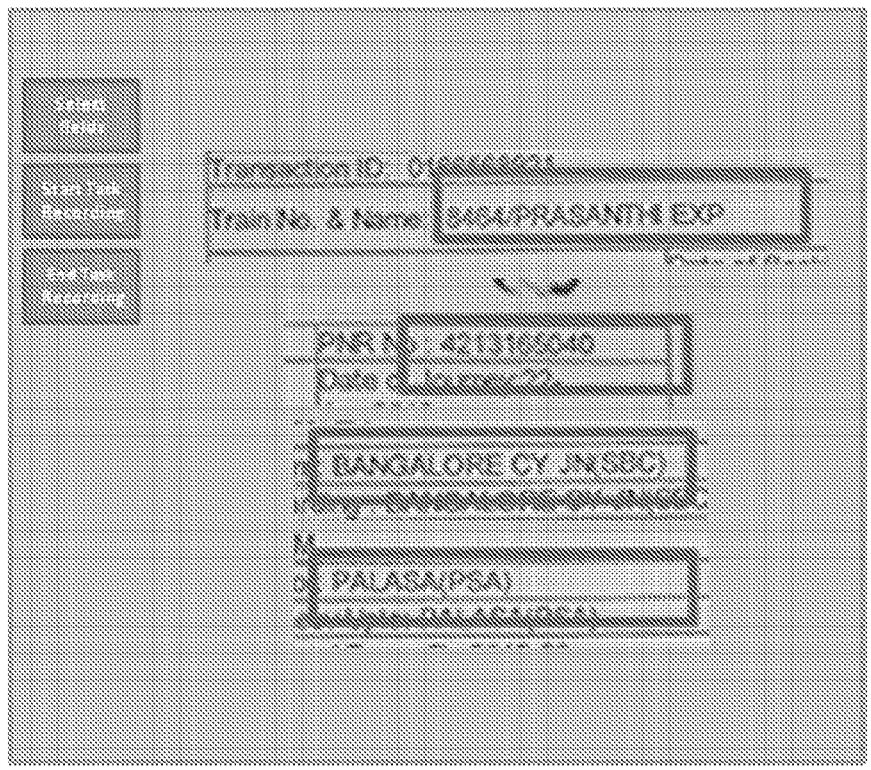
FIG. 4 is a diagram of a graphical user interface (GUI), in which a user selects at least one area of interest in an image, according to an embodiment.

FIG. 4 is a diagram of a graphical user interface (GUI), in which a user selects at least one area of interest in an image, according to an embodiment. The GUI of the authoring application provides a "Select fields" button to a user to enable him or her to select fields of interest in an image. By selecting "Select fields" button, a user conveys his or her intent to the authoring application for selecting fields of interest in the image. The fields (areas) of interest may be selected, for example, and by way of non-limiting illustration, by tapping on the region of interest on the display device or by clicking with mouse and selecting the region of interest on the image.

In the present illustration, a user has selected fours areas of interest in the image. They include entries related to Train No. and Name, PNR No., Origin station and destination station.

Figure 5:
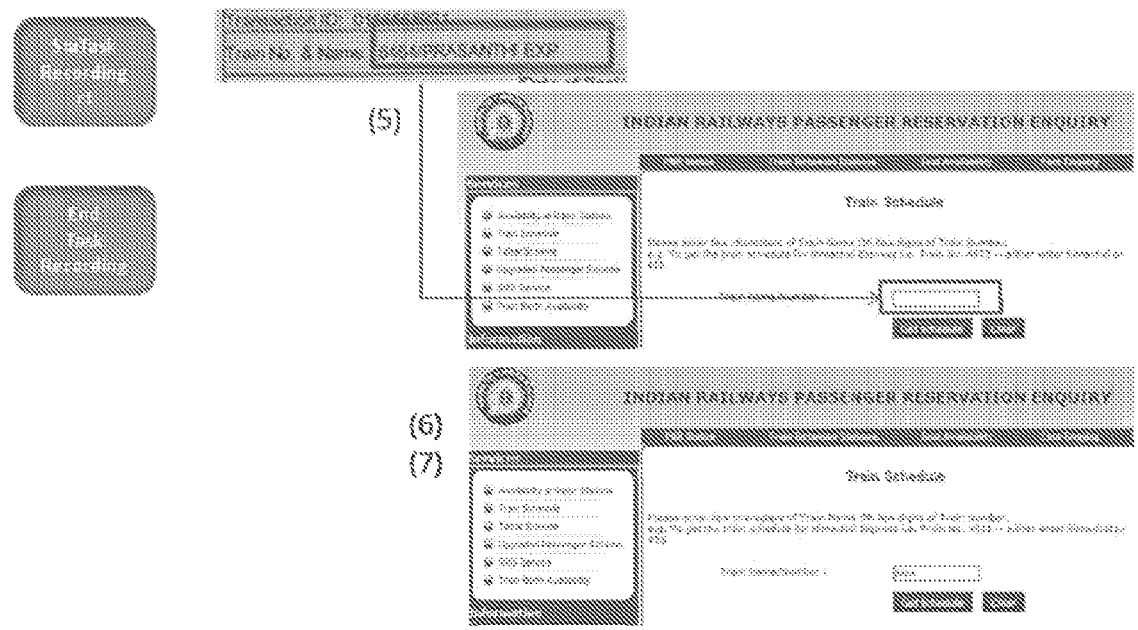
FIG. 5 is a diagram of a graphical user interface (GUI), in which a user selects a start task recording command, according to an embodiment.

FIG. 5 is a diagram of a graphical user interface (GUI), in which a user selects a start task recording command, according to an embodiment. By selecting "Start task recording" button, a user conveys his or her intent to the authoring application for recording an association between a task and an image. In the present illustration, after a user has selected the recording button, the user maps an area of interest (Train No. and Name) with a parameter (Train Name/Number) of an online Train Schedule request. The entry corresponding to the area of interest (8464) also acts as an input for the related parameter (Train Name/Number) of the task.

Figure 6:
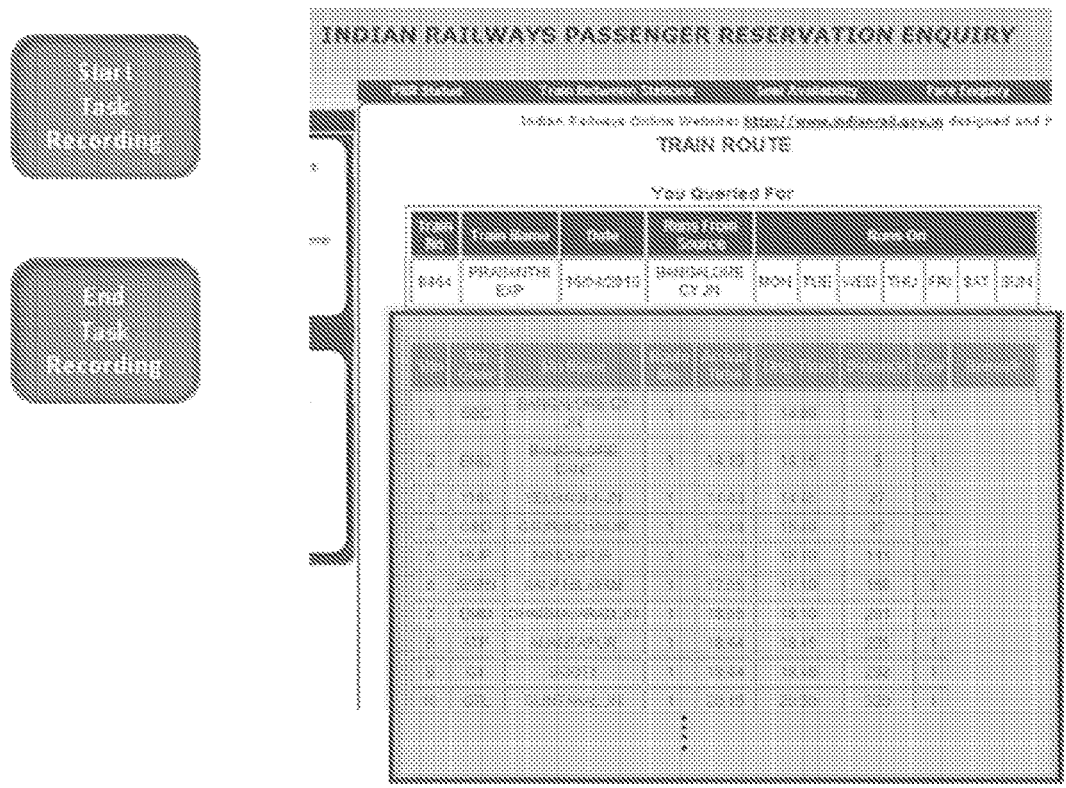
FIG. 6 is a diagram of a graphical user interface (GUI), in which a user selects an end task recording command, according to an embodiment.

FIG. 6 is a diagram of a graphical user interface (GUI), in which a user selects an end task recording command, according to an embodiment. Once a user has completed mapping an image (or an area of an image) to a task (or a task parameter), the user may select "End task recording" button to conveys his or her intent to the authoring application for ending the recording of the association between a task and an image. After a recording is complete it is stored on the user's computing device on which the authoring application is hosted or another computing device which may be communicatively coupled to the user's device.

Figure 7:
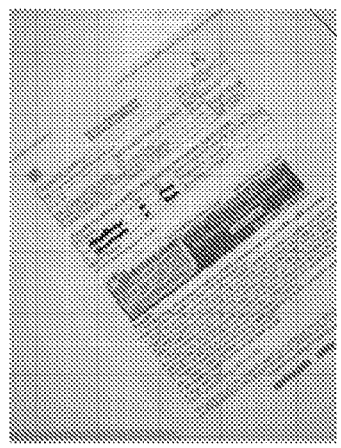
FIG. 7 shows an example of a subsequent image, according to an embodiment.

FIG. 7 shows an example of a subsequent image, according to an embodiment. The representation shows another instance of an original input image. The image may be a subsequent image of a document for finding tasks that might be associated with the image.

Figure 8:
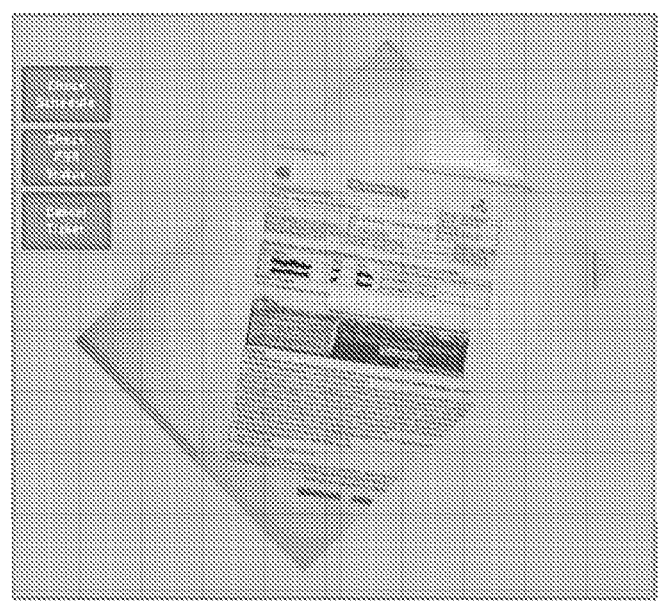
FIG. 8 is a diagram of a graphical user interface (GUI), in which the method recognises the image and displays at least one task associated with the image, according to an embodiment.

FIG. 8 is a diagram of a graphical user interface (GUI), in which the method recognises the image and displays at least one task associated with the image, according to an embodiment. In the illustration, the GUI displays the tasks that were previously associated with an image. They include, "Check Schedule", "Check PNR Status" and "Cancel Ticket". The associated tasks are displayed on a user's device upon subsequent recognition of an input image. These are the tasks that may be performed on the document image (railway ticket).

FIG. 9 is a diagram of a graphical user interface (GUI), in which a user selects at least one task associated with an image, according to an embodiment. In the present illustration, the user conveys his or her intent to execute the "Check Schedule" task by selecting "Check Schedule" task command button on the GUI.

FIG. 10 is a diagram of a graphical user interface (GUI), in which the method displays execution of a selected task, according to an embodiment. In the illustration, the selected task is executed since the method recognises from the previous recording that "Check Schedule" task requires a train number, which it obtains from the image.

Figure 11:
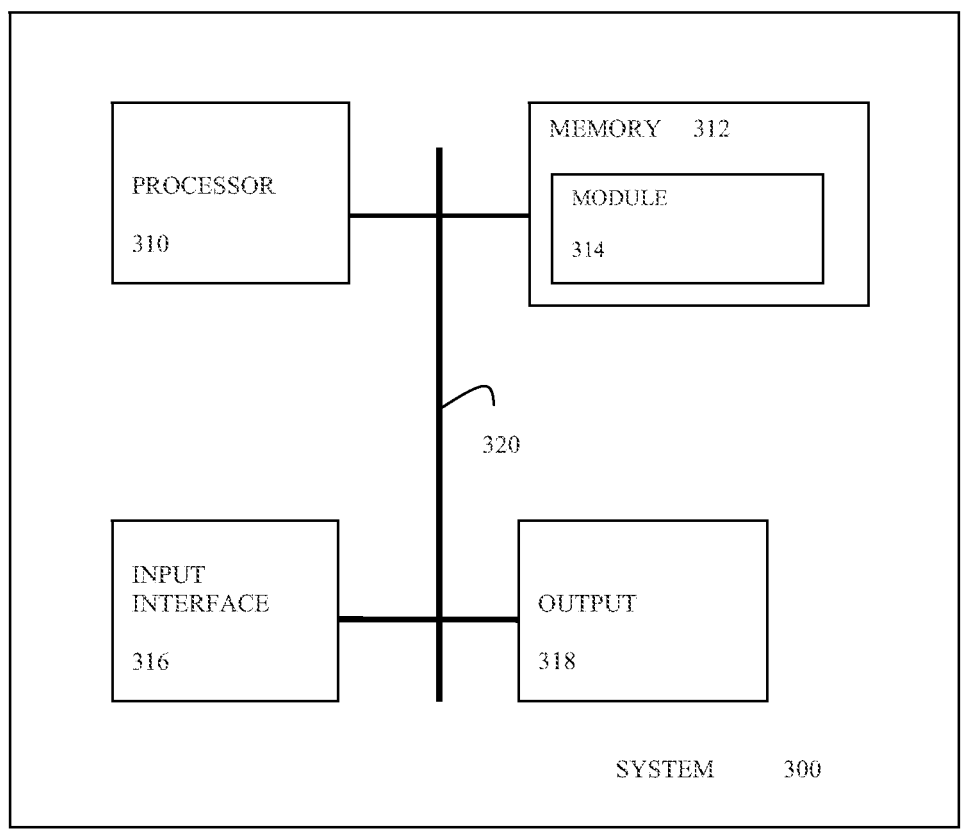
FIG. 11 shows a block diagram of a user's computing system, according to an embodiment.

FIG. 11 shows a block diagram of a user's computing system, according to an embodiment.

The system 300 may be a computing device, such as, but not limited to, a personal computer, a desktop computer, a laptop computer, a notebook computer, a network computer, a personal digital assistant (PDA), a mobile device, a handheld device, or the like.

System 300 may include a processor 310, for executing machine readable instructions, a memory 312, for storing machine readable instructions (such as, a module 314), an input interface 316 and an output device 318. These components may be coupled together through a system bus 320.

Processor 310 is arranged to execute machine readable instructions. The machine readable instructions may comprise a module that allow a user to record an association between an image and at least one task, wherein a task is an action related to content present in the image, and upon subsequent recognition of the image, guides a user to perform the at least one task associated with the image, based on previously recorded association.

It is clarified that the term "module", as used herein, means, but is not limited to, a software or hardware component. A module may include, by way of example, components, such as software components, processes, functions, attributes, procedures, drivers, firmware, data, databases, and data structures. The module may reside on a volatile or non-volatile storage medium and configured to interact with a processor of a computer system.

The memory 312 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 312 may include a module 314. It may also act as a storage medium that stores the recording of an association between an image and a task.

The input interface (input system) 316 may include a sensor. The input interface may be an imaging device (for example, a camera). The imaging device may be a separate device, which may be attachable to the computing device 300, or it may be integrated with the computing system. In an example, the imaging device may be a camera, which may be a still camera, a video camera, a digital camera, and the like. The imaging device may capture an image or a series of images.

The input interface may allow a user to provide an input to record an association between an image and at least one task, wherein a task is an action related to content present in the image. It may also allow a user to identify at least one area of interest on the image and to map the at least one identified area of interest with a corresponding parameter of the at least one task.

The input system may be a keyboard, a mouse, a trackball, a joystick, a touch recognition system, a voice recognition system and a gesture recognition system.

The output device 318 may include a Virtual Display Unit (VDU) for displaying, inter alia, a graphical user interface (GUI). The graphical user interface may comprise at least one command, wherein the at least one command allows a user to record an association between an image and at least one task, wherein a task is an action related to content present in the image.

It would be appreciated that the system components depicted in FIG. 3 are for the purpose of illustration only and the actual components may vary depending on the computing system and architecture deployed for implementation of the present solution. The various components described above may be hosted on a single computing system or multiple computer systems, including servers, connected together through suitable means.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

What is claimed is:

1. A computer implemented method for guiding an image-based task execution, comprising:
   receiving an image of a document;
   allowing a user of a computing device to store an association between the image and at least one task, wherein the at least one task is an action related to content present in the image, wherein allowing the user to store the association includes:
      receiving a selection of at least one area of interest on the image, wherein the at least one area of interest includes a plurality of areas of interest on the image and wherein receiving the selection includes receiving a selection of each of the plurality areas of interest; and
      storing a mapping of the at least one area of interest with a corresponding parameter of the at least one task including storing a mapping of each area of interest with a parameter of a plurality of parameters and a different task of a plurality of tasks, wherein each task includes steps providing user guidance to perform the task;
   subsequently receiving another captured image of the document; and
   upon recognition of the subsequently captured image of the document, presenting the user with the plurality of tasks associated with the plurality of areas of interest, receiving a selection of one of the tasks, and guiding the user to perform the at least one task associated with the image based on the mapping of the at least one area of interest to the corresponding parameter of the at least one task, wherein guiding the user to perform the at least one task comprises prompting the user to perform the steps of the selected task based on the stored mappings.

2. The method of claim 1, wherein the identified at least one area of interest on the image is an input for the at least one task.

3. The method of claim 1, wherein guiding the user to perform the at least one task comprises:
   prompting the user to select the at least one area of interest on the image.

4. The method of claim 1, wherein guiding the user to perform the at least one task associated with the image comprises:
   determining whether the subsequently received image is inadequate to perform the at least one task; and
   in response to determining the subsequently received image is inadequate to perform the at least one task, prompting the user to obtain at least one additional copy of the subsequently received image.

5. The method of claim 1, wherein storing the mapping comprises:
   storing the mapping on the computing device, wherein the computing device is a user computing device, or storing the mapping on a remote computing device connectable to the user computing device.

6. The method of claim 1, wherein the at least one task includes a web based transaction.

7. The method of claim 1, wherein the image and the subsequently captured image are two different images of the same document.

8. The method of claim 1, wherein the image is a pre-existing image or an image newly created by the user.

9. A system comprising:
a processor that executes machine readable instructions to:
receive a first image of a paper document;
allow a user to store an association between the image and at least one task, wherein the at least one task is an action related to content of the paper document present in the image, wherein to allow the user to store the association includes:
receive a selection of at least one area of interest on the first image, wherein the at least one area of interest includes a plurality of areas of interest on the image and wherein to receive the selection includes to receive a selection of each of the plurality of areas of interest; and
store a mapping of the at least one area of interest with a corresponding parameter of the at least one task, wherein to store the mapping includes to store a mapping of each area of interest with a parameter of a plurality of parameters and a different task of a plurality of tasks, wherein each task includes steps providing user guidance to perform the task;
subsequently receive a second captured image of the paper document; and
upon recognition of the second image, present the user with the plurality of tasks associated with the plurality of areas of interest, receive a selection of one of the tasks, and guide the user to perform the at least one task based on the mapping of the at least one area of interest to the corresponding parameter of the at least one task, wherein to guide the user to perform the at least one task comprises prompt the user to perform the steps of the selected task based on the stored mappings.

10. The system of claim 9, further comprising a display device that displays a graphical user interface (GUI), the graphical user interface comprising at least one command, wherein the at least one command allows the user to record the mapping between the at least one area of interest and a corresponding parameter of the at least one task.

11. The system of claim 10, further comprising an input interface that allows a user to provide an input to record the mapping.

12. The system of claim 11, wherein the input interface allows the user to identify the at least one area of interest on the first image.

13. The system of claim 11, wherein the at least one area of interest is an input for the at least one task.

14. The system of claim 9, further comprising a sensing device that captures an image or a series of images, wherein if a series of images is captured, the images are stitched together by an application to create a single image.

15. The system of claim 9, comprising an input device including at least one of a keyboard, a mouse, a trackball, a joystick, a touch recognition system, a voice recognition system and a gesture recognition system.

16. The system of claim 9, wherein the first and second images are two different images of the same paper document.

17. The system of claim 9, wherein the system is a mobile device.

18. A non-transitory computer readable medium including machine readable instructions that are executable by a computing device to:
receive an image of a document;
allow a user of the computing device to store an association between the image and at least one task, wherein the at least one task is an action related to content present in the image, wherein to allow the user to store the association includes:
receive a selection of at least one area of interest on the image, wherein the at least one area of interest includes a plurality of areas of interest on the image and wherein to receive the selection includes to receive a selection of each of the plurality of areas of interest; and
store a mapping of the at least one area of interest with a corresponding parameter of the at least one task, wherein to store the mapping includes to store a mapping of each area of interest with a parameter of a plurality of parameters and a different task of a plurality of tasks, wherein each task includes steps providing user guidance to perform the task; and
subsequently receive another captured image of the document; and
upon recognition of the subsequently received image, present the user with the plurality of tasks associated with the plurality of areas of interest, receive a selection of one of the tasks, and guide the user to perform the at least one task associated with the image based on the mapping of the at least one area of interest to the corresponding parameter of the at least one task, wherein to guide the user to perform the at least one task comprises prompt the user to perform the steps of the selected task based on the stored mappings.

* * * * *